Figure 1A:
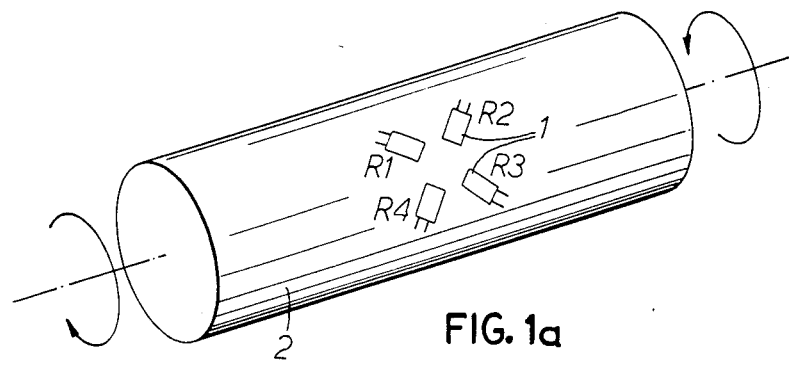

United States Patent [19]

Harbour

[11] Patent Number: 4,649,758
[45] Date of Patent: Mar. 17, 1987

[54] TORQUE SENSING APPARATUS

[75] Inventor: John Harbour, Wiltshire, United Kingdom

[73] Assignee: TRW Transportation Electronics Limited, Cirencester, Great Britain

[21] Appl. No.: 717,455

[22] Filed: Mar. 29, 1985

[30] Foreign Application Priority Data

Apr. 3, 1984 [GB] United Kingdom ............... 8408502

[51] Int. Cl.⁴ .............................................. G01L 3/10
[52] U.S. Cl. .................................... 73/862.35; 73/782
[58] Field of Search ............... 73/862.33, 862.35, 769, 73/773, 781, 782, 862.08

[56] References Cited

U.S. PATENT DOCUMENTS

| | | | |
|---|---|---|---|
| 2,633,019 | 3/1953 | Albrecht et al. | 73/769 |
| 3,617,878 | 11/1971 | Senour | 73/769 X |
| 3,717,029 | 2/1973 | Tveter | 73/862.35 X |
| 3,855,857 | 12/1974 | Claycomb | 73/151 |
| 4,312,241 | 1/1982 | Budraitis | 73/862.35 |
| 4,545,261 | 10/1985 | Gebben | 73/862.33 |

FOREIGN PATENT DOCUMENTS 0957653  5/1964  United Kingdom ............ 73/862.35

Primary Examiner—Charles A. Ruehl
Attorney, Agent, or Firm—Tarolli, Sundheim & Covell

[57] ABSTRACT

A rotary shaft (13) is fitted with strain gauges (17) in a bridge formation arranged to give a response to torque. Windings (18a, 19a) surround the shaft at axially spaced zones and rotate with it, co-operating with fixed windings (18b, 19b) providing transformer coupling. AC is applied across the bridge via one transformer (18) and an output from the bridge is available from the other transformer (19). This output has a phase shift related to torque, and a phase shift detector (24) and filter (25) provide a torque indicative DC signal. The strain gauges (17) are mounted on a compliant bridge (15,16) anchored at axially spaced zones to the relatively stiff shaft (13) for greater response.

4 Claims, 7 Drawing Figures

TORQUE SENSING APPARATUS

This invention relates to torque sensing apparatus.

The torque on a shaft can be measured by using data from foil gauges adhered directly to the surface of the shaft or from a transducer partially inset into the shaft. Suitable transducers and mounting arrangements are described for example in British Pat. No. 2,050,624B and in European Application Publication No. 0127278, and a particular use on vehicle axles is described in European Application Publication No. 0132930.

There is a difficulty with measuring the torque of continuously rotating shafts, since there cannot be permanent wire connections to the strain gauges. Slip rings are an obvious solution, but they are unreliable for the type and size of signals obtainable from the transducers referred to above. Transformer techniques have been proposed but generally they rely on a high permeability shaft, and also windings of considerable complexity.

In addition, it is not always possible to adhere foil gauges directly to a shaft because of its operating conditions, and it is not necessarily possible or desirable to drill holes in the surface to fit a transducer. Also, many shafts are operated with a high margin of safety on torque load, so that normal loading gives relatively small signals from a conventionally mounted sensor.

It is the aim of this invention to provide an alternative and potentially accurate and reliable system for measuring the torque on a rotary shaft and, where necessary, to alleviate the lack of sensitivity of a massive, stiff shaft.

According to the present invention there is provided torque sensing apparatus comprising a strain sensitive device with a bridge arrangement of gauges, characterised in that it is for a rotary workpiece and in that there are further provided transformers, each with one winding for rotating with the workpiece and another winding fixed, means for feeding an oscillating signal to one fixed winding, means connecting the rotary windings to the bridge, and means for comparing the phase of the signal to said one fixed winding with the phase of the signal from the other fixed winding, the phase difference being indicative of torque.

The transformer will preferably be axially spaced on opposite sides of the strain sensitive device. The windings may simply be turns co-axial with the workpiece, and preferably they will be housed in annular channeled yokes which co-operate to enhance the magnetic coupling.

The strain sensitive device will conveniently be mounted at an intermidiate point on a bridge member attached at axially spaced zones to the rotary workpiece, the bridge member being substantially more compliant than the rotary workpiece. Preferably, the bridge member will be cylindrical and co-axially sleeve the workpiece with an annular gap intermediate the attachment zones. The response may be improved by cutting away part of the cylinder to form a central neck on which the strain sensitive device is mounted.

According to another aspect of the invention there is provided torque sensing apparatus comprising means for attachment at axially spaced points to a workpiece subject to torque about is axis, a bridge member between, and spaced from the workpiece by, said attachment means, and a strain sensitive device at an intermediate point on the bridge member.

Figure 1B:
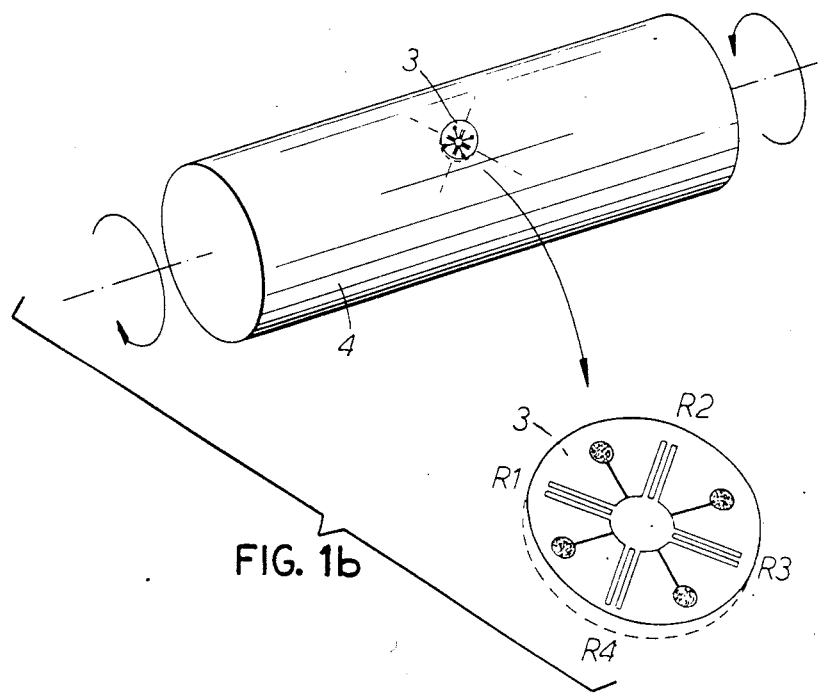
Figure 2:
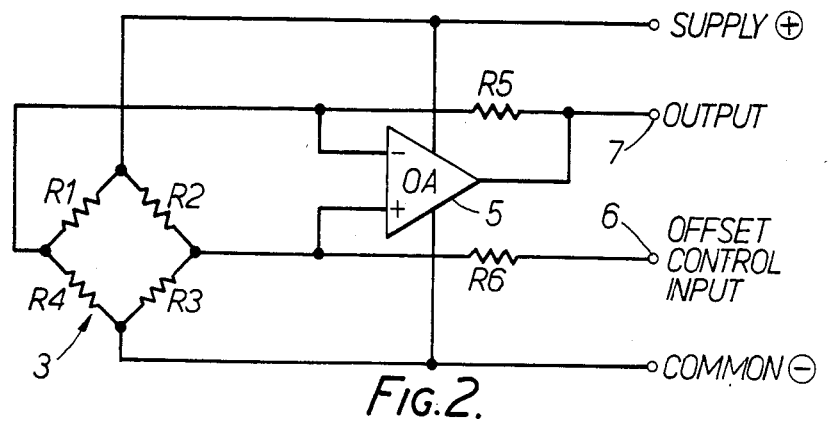
Figure 3:
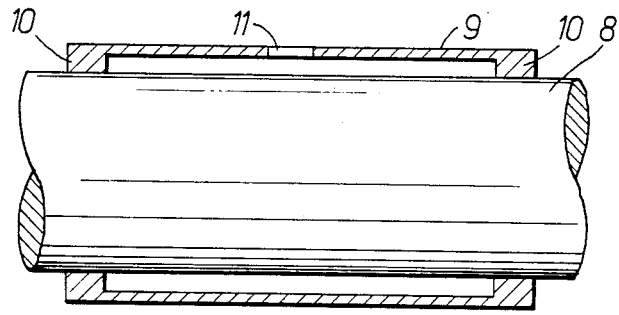
Figure 4:
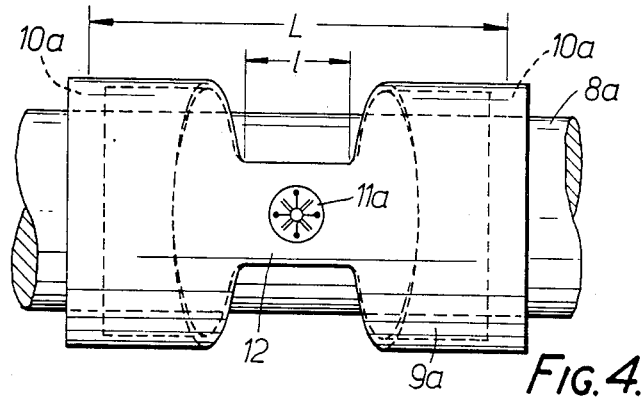
Figure 5:
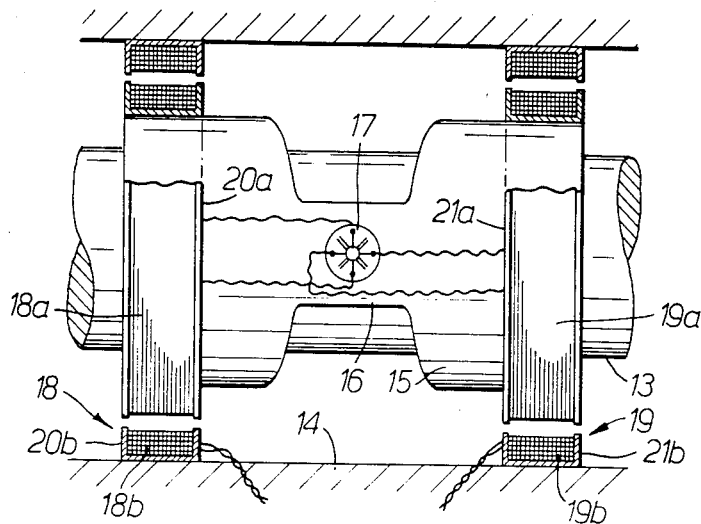
Figure 6:
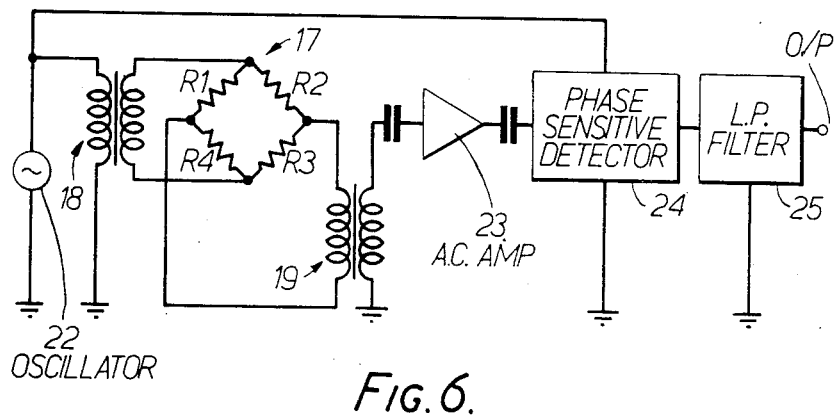

For a better understanding of the invention an embodiment will now be described, by way of example, with reference to the accompanying drawings, in which:

FIG. 1(a) shows a diagrammatic perspective view of a shaft with foil gauges,

FIG. 1(b) shows a diagrammatic perspective view of a shaft with a transducer fitted thereto with an enlarged view of the transducer, FIG. 2 is a diagram of a circuit associated with such sensors, FIG. 3 shows a portion of a shaft with a transducer mounting in axial section, FIG. 4 shows a portion of a shaft with a modified transducer mounting, FIG. 5 shows a portion of a rotary shaft with transformer coupling to a strain transducer, and FIG. 6 is a circuit diagram associated with FIG. 5.

To measure torque, foil gauges 1 may be adhered to the surface of a shaft 2 as shown at FIG. 1(a). The gauges are in pairs lying in symmetrical formation on the lines of opposed helices of 45° pitch. An equivalent arrangement is shown at FIG. 1(b), where a transducer 3 is inset into a shallow hole in the surface of the shaft 4, this transducer in effect incorporating four strain gauges in similar formation.

These gauges are also labelled as resistors R1,R2,R3 and R4 for the purpose of FIG. 2, which shows their connection, and also in FIG. 6. When torque is applied, R1 and R3 will change their resistance in one sense (for example reduce it) while the other resistors R2 and R4 will change in the opposite sense (increase in this example). They are arranged in a bridge circuit with a DC supply across one pair of opposed corners and the output taken from across the other pair. This is directed to an operational amplifier 5, to one input of which is also applied an offset control input 6. The output of the amplifier is to terminal 7 and there is also feedback to the other input via a resistor. The control input 6 may be adjusted to ensure that the output from terminal 7 at zero strain is equal to the desired zero reference level.

The drawbacks of mounting the gauges or transducer as in FIGS. 1(a) and 1(b) have been described. A possible solution to the mounting problem is shown in FIG. 3 in which a shaft 8 is sleeved by a co-axial cylinder 9 having end rings 10 which are secured to the shaft 8 by welding, soldering or brazing, or by interference fit. As shown, the rings 10 are integral with the cylinder 9, but they may be separately constructed. They hold the cylinder so that there is a small annular gap between it and the shaft, and if the latter is subject to torque, so will the cylinder 9 be over the greater part of its axial length where it bridges the rings 10. A strain transducer disc 11 is inset centrally into it, with its component gauges oriented as described. These will produce data indicative of the torque on the cylinder 9, which will in turn be indicative of the torque on the shaft 8.

The cylinder will stiffen the shaft locally between the rings 10, but not to any great extent since it is thin walled and considerably more compliant than the shaft itself.

To increase the sensitivity, the cylinder may be cut away as shown in FIG. 4. Similar parts are referenced as in FIG. 3, but with the suffix a. This cutaway leaves the cylinder 9a with a neck 12 symmetrically between the rings 10a, and the transducer 11a is central of this neck. The relative axial dimensions of the cylinder and its cutaway are indicated by L and l respectively. For any given torsional strain in the shaft, a larger torsional strain will be experienced by the transducer 11a by a factor of approximately L/1, since in effect only the neck 12 will be compliant and the complete end portions of the cylinder will be substantially rigid.

The above assumes that the data from the strain gauges can be conveyed to processing circuitry not rotating with the shaft, and the problems with this have been mentioned above. FIG. 5 shows a proposed solution.

A shaft 13 extends through a stationary housing 14 and is fitted with a cutaway cylinder 15 similar to that of FIG. 4. The neck is here referenced 16 and a strain gauge transducer 17 is fitted centrally to it. At the ends of the cylinder there are transformers 18 and 19, one winding 18a,19a of each being on the cylinder 15 and the others 18b,19b being on the housing 14. The windings are simply a plurality of turns co-axial with the shaft, and they are housed in annular, channeled yokes 20a,20b,21a,21b. The channels are open towards each other and they are of high magnetic permeability, such as ferrite, to provide efficient transformer coupling. Fine accuracy in their positioning and the winding operation is not necessary.

The transducer 17 is wired to the windings 18a,19a as shown in FIG. 6, one being the secondary of the transformer 18 and the other being the primary of the transformer 19. When an oscillator 22 energizers the primary 18b of the transformer 18, a transducer output is available from the secondary 19b of the transformer 19, whence it is directed through a high gain amplifier 23 to a phase sensitive detector 24 which also receives the oscillator output direct. From this and a low pass filter 25 there is produced a DC voltage which will be proportional to the torque in magnitude and size.

Should either transformer fail, or the amplifier 23, then the output signal will revert to zero. This is a fail safe feature of great importance in certain applications.

Although the yokes will concentrate the respective magnetic fields within a fairly narrow zone, the transformers are spaced apart on opposite sides of the transducer to reduce as far as possible any mutual interference.

It is not essential to have the symmetrical arrangement shown: it may not always be practical, and in some circumstances the transformers may both be on the same side and well removed from the transducer. Also, although shown at the ends of the cylinder 15, overlying the attachment zones, the inner windings of the transformers may be mounted directly on the shaft.

I claim:

1. Torque sensing apparatus for measuring torque in a shaft, comprising:
   ring means embracing and rigidly fitted to the shaft at axially spaced zones;
   a generally cylindrical thin sheet member radially clear of the shaft, co-axial with said rings, spanning said rings and effectively integral therewith, said cylindrical thin sheet member symmetrically cut away over a central portion so as to leave a neck section of substantially reduced circumferential extent and of substantially greater compliance than the shaft; and
   a strain gauge transducer with gauges in bridge formation mounted on said neck section and arranged to respond to torque.

2. The torque sensing apparatus of claim 1 further comprising two annular windings carried co-axially on the shaft and connected to different parts of the bridge formation of gauges, each annular winding carried on the shaft having an associated fixed annular winding closely cooperating in transformer relationship therewith, means for feeding an oscillating input signal to one fixed winding, and means for comparing the phase of said input signal with the phase of an output signal from the other fixed winding, the phase difference being indicative of torque.

3. Torque sensing apparatus according to claim 2, wherein the windings carried on the shaft are mounted at opposite ends of the cylindrical thin sheet member.

4. Torque sensing apparatus as claimed in claim 3, wherein the windings are housed in annular channelled yokes which co-operate to enhance the magnetic coupling.

* * * * *